United States Patent [19]

Padovani

[11] 4,105,736
[45] Aug. 8, 1978

[54] SYSTEM FOR THE PRODUCTION OF FINISHED HOLLOW OBJECTS, FORMED FROM A STRIP OF PLASTICS MATERIAL BY HEAT MOULDING

[75] Inventor: Pietro Padovani, Verona, Italy

[73] Assignee: O.M.V. S.p.A., Verona, Italy

[21] Appl. No.: 730,354

[22] Filed: Oct. 7, 1976

[30] Foreign Application Priority Data

Oct. 9, 1975 [IT] Italy .................. 84957 A/75

[51] Int. Cl.² ............... B29C 17/02; B29C 17/04
[52] U.S. Cl. ............................ 264/153; 264/92; 264/163; 264/292; 264/297; 264/322; 425/302.1; 425/340; 425/342.1; 425/387.1; 425/388; 425/398
[58] Field of Search ............. 264/89, 90, 92, 93, 264/94, 153, 292, 297, 322, 163; 425/292, 302 R, 340, 342, 343, 387 R, 388, 398, 387.1, 302.1, 342.1

[56] References Cited

U.S. PATENT DOCUMENTS

| | | | |
|---|---|---|---|
| 2,953,814 | 9/1960 | Mumford | 264/92 X |
| 3,197,816 | 8/1965 | Häberle | 425/388 X |
| 3,832,102 | 8/1974 | Alroy | 425/387 R X |
| 3,836,309 | 9/1974 | Thiel | 425/388 X |
| 3,941,542 | 3/1976 | Uhlig | 425/342 X |

*Primary Examiner*—Jan H. Silbaugh

[57] ABSTRACT

A system for the production of hollow finished objects, formed from a strip of plastic material by heat moulding, utilizing a process comprising the phases of feeding the strip, heating the strip, heat moulding from the strip and cutting therefrom the hollow objects in only one station, extraction of the finished hollow objects with stacking thereof, and arrangement of the remaining strip material from the process, in which the inoperative time of the heat moulding cycle is slightly greater than the cutting time added to the feed time of the strip in the heat moulding station.

9 Claims, 10 Drawing Figures

Fig. 9
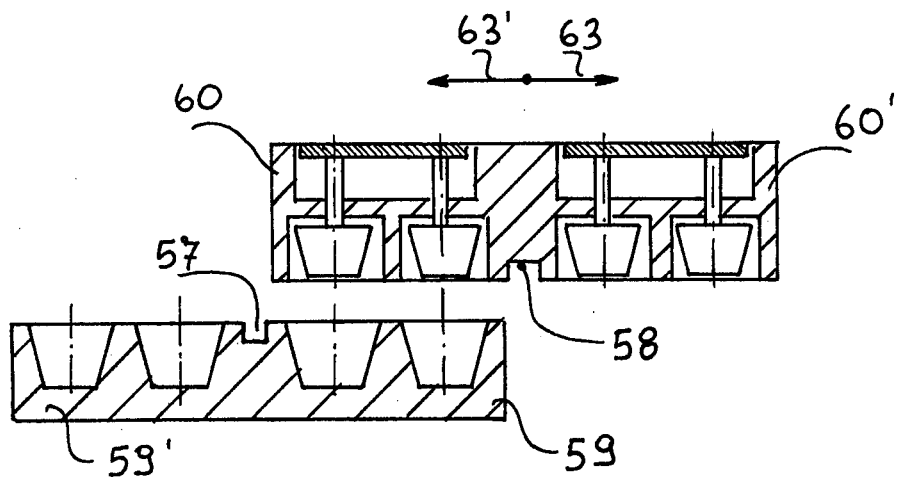
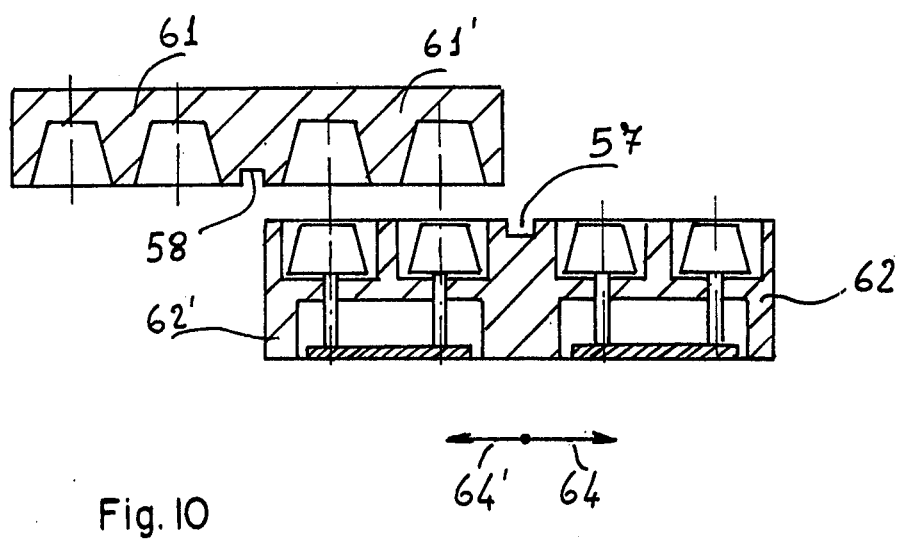
Fig. 10

SYSTEM FOR THE PRODUCTION OF FINISHED HOLLOW OBJECTS, FORMED FROM A STRIP OF PLASTICS MATERIAL BY HEAT MOULDING

Systems used today for the production of finished hollow objects, formed from a strip of plastics material by heat moulding, are basically associated with two processes which will be hereinafter indicated as the first process and the second process.

In both processes, the heat moulding cycle time is determined by the sum of the operative and inoperative periods. The operative period extends from the beginning of the heat moulding until the strip adheres to the die, positive or negative, of the mould. The inoperative time extends from the end of the operating time of one cycle to the beginning of the operative time of the next cycle.

The first process, normally used in horizontal heat moulding machines with an intermittently fed strip, comprises the following phases:
(1) Feeding of the strip, usually unwound from a spool,
(2) Heating of the strip,
(3) Moulding of hollow objects from the strip,
(4) Stabilisation of the heat moulded structure,
(5) Extraction of the structure from the dies of the mould,
(6) Feeding the strip by one stage,
(7) Cutting the hollow objects from the plate,
(8) Expulsion of finished objects,
(9) Stacking of finished objects,
(10) Collection of remaining strip material, usually by spooling.

Phases 3, 4, 5 and 6 are carried out at a single station.

In the second process, normally used in vertical heat moulding machines with an intermittently fed strip, phase 5 is usually postponed to after phase 7 and concerns the extraction of finished objects, whilst phase 6 is postponed to after phase 8. Therefore, in the second process, phases 3, 4 and 7, 5, 8, 6 are effected at a single station.

The first process has two disadvantages:
Limited precision of the cutting operation; and
The inoperative period of the cycle is conditioned by the depth of the heat moulded structure, by the stabilisation thereof, and by the extraction of the structure from the dies of the mould.

The limited cutting precision involves the production of finished objects having unequal outer profiles, due to errors, if only minimum, due to the centring devices of the structure in the cutting station.

The inoperative period of the cycle results in fact from the sum of the periods for:
(a) The opening relative to a space between the two parts of the mould at least equal to the depth of the heat moulded structure;
(b) Stabilisation of the heat moulded structure;
(c) Period of the open mould for the extraction of the structure from the dies of the mould;
(d) Period during which the mould is open for advancing the strip by one stage; and
(e) For the closing of the two parts of the mould to begin the next cycle.

With the second process, precision in cutting is obtained, at the cost of the inoperative period of the cycle which has to be considerably increased. In fact the inoperative period of the cycle must be increased by the cutting time, the longer time for the opening, associated with a space between the two parts of the mould, being dependent upon the depth of the heat moulded structure, the greater period during which the mould is open for the discharge of finished objects and by the longer time for the closing of the two parts of the mould for beginning the next cycle.

Furthermore, with the second process, the finished objects are usually discharged at random, thus making it necessary to use a device for reorganising the finished objects.

It is an object of the present invention to provide a process in which the inoperative time of the heat moulding cycle is considerably reduced compared with the inoperative time of heat moulding cycles in the known processes.

Another object of the present invention is to achieve precision in the cutting of heat moulded objects.

A further object of the present invention is to considerably increase the time for the stabilisation of the heat moulded and cut objects without having any influence on the inoperative time of the heat moulding cycle.

According to the present invention there is provided a system for the production of hollow finished objects, formed from a strip of plastic material by heat moulding, utilising a process comprising the phases of feeding the strip, heating the strip, heat moulding from the strip and cutting therefrom the hollow objects in only one station, extraction of the finished hollow objects with stacking thereof and arrangement of the remaining strip material from the process, in which the inoperative time of the heat moulding cycle is slightly greater than the cutting time added to the feed time of the strip in the heat moulding station.

The present invention will be further illustrated, by way of example, in relation to a horizontal heat moulding machine with an intermittently fed strip, with reference to the accompanying drawings, in which:

FIGS. 9 and 10 show schematic sectional views of moulds which may replace the moulds shown in FIGS. 2 and 3.

The same reference numerals are utilised to indicate the same parts in various Figures, even though such parts are shown on different scales.

Figure 1:
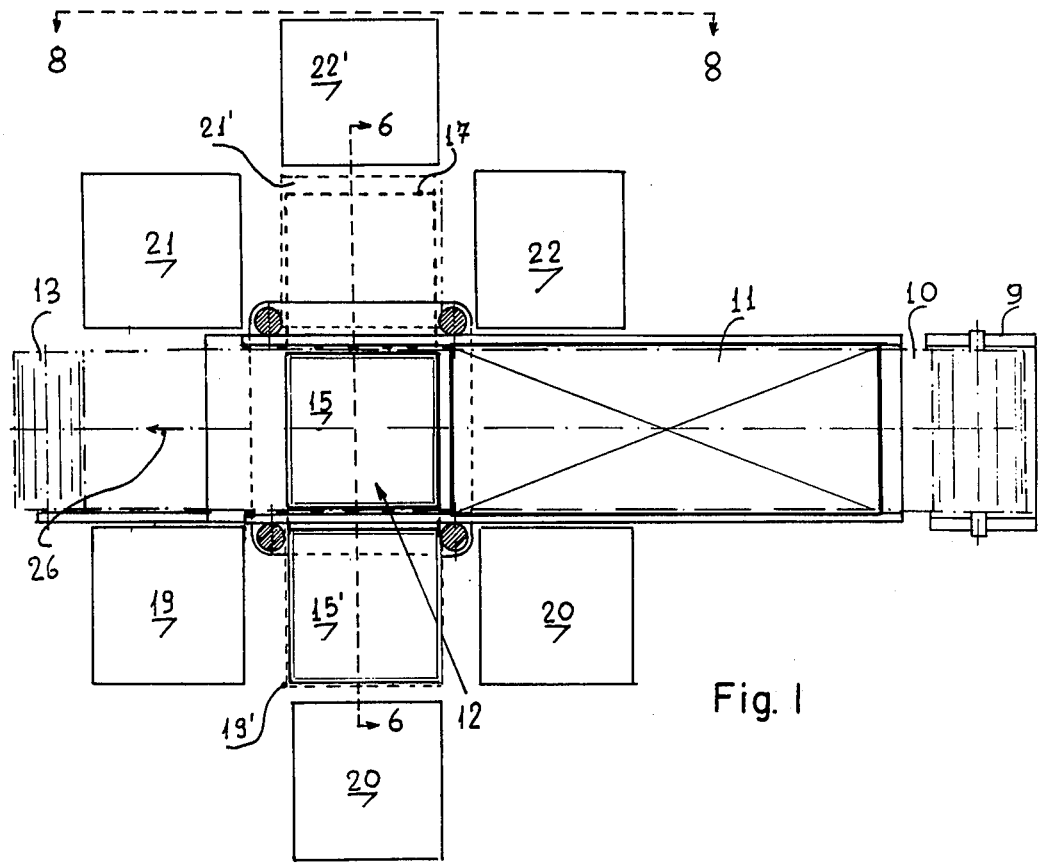
FIG. 1 is a top plan view of a machine for carrying out the invention, as a horizontal section just above the plane of movement of the strip.

As illustrated in FIG. 1, the machine comprises a feed mechanism 9 for the unwinding of a strip 10, means for heating the strip 11, a heat moulding and stacking station 12 and a mechanism 13 for the arrangement of the remaining strip material by spooling.

Figure 2:
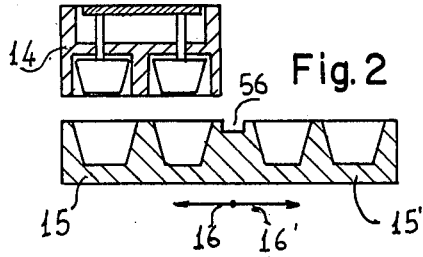
FIG. 2 is a schematic sectional view of the two parts of a mould utilisable in the process of the present invention.

The two parts of the mould operate at station 12 which, for the purposes of the invention, has a special construction, as will be seen in FIG. 2. The part 14 is intended to always operate co-axially with the station 12, whilst the part 15-15′, is almost double, compared with conventional moulds in use, for co-operating with the part 14 in a reciprocating manner with its halves 15, 15′ moving from station 12 in the directions of the arrows 16, 16′. In fact, as will be seen from FIGS. 1 and 6, the half 15′ is completely external of the station 12 whilst the half 15 is coaxial with station 12.

Figure 7:
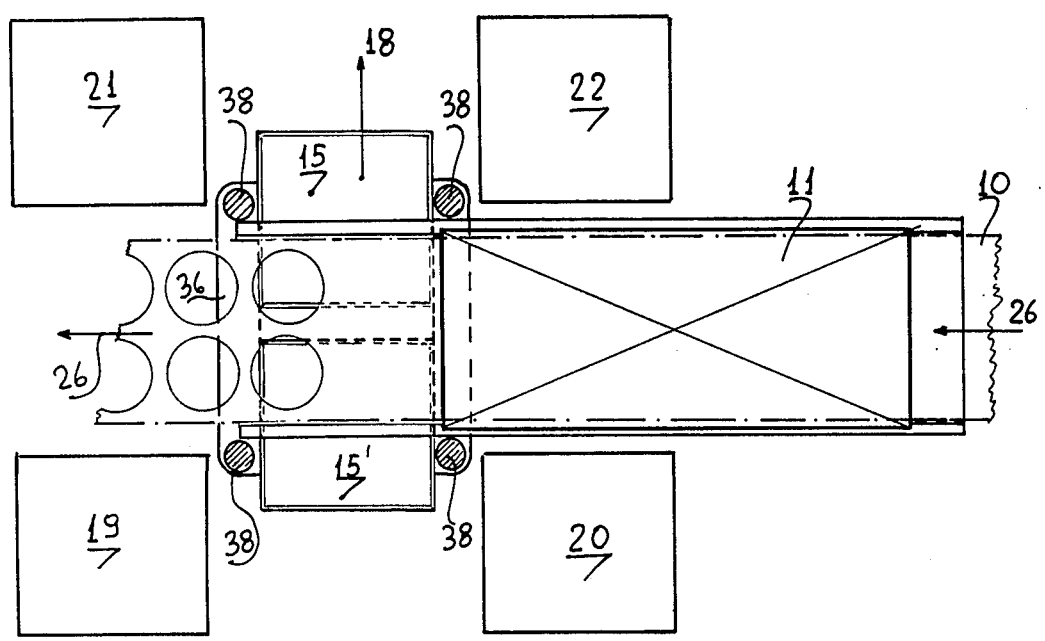
FIG. 7 is a partial schematic top view of the machine of FIG. 1.

FIG. 1 shows in broken lines 17 the position assumed by the half 15 at the end of the displacement indicated by the arrow 18 in FIG. 7.

With reference to FIG. 1, eight stacking stations for the finished object are indicated by 19, 19′, 20, 20′, 21, 21′, 22, 22′, whilst, for clarity the stations 19, 20, 21, 22 are indicated in the remaining Figures. It is obvious that the number of stacking stations and the position thereof relatively to the machine will have no influence on the substance of the present invention.

Figure 3:
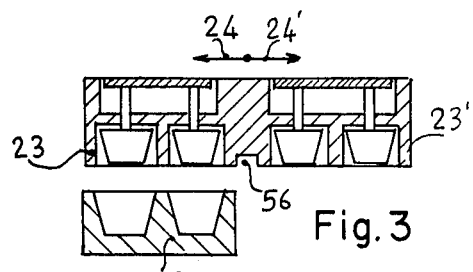
FIG. 3 is a schematic sectional view of an alternative embodiment of the two parts of a mould utilisable in the process of the present invention.
Figure 4:
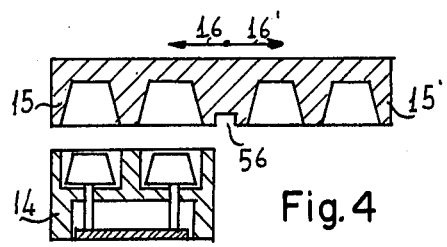
FIGS. 4 and 5 are schematic sectional views of the two parts of the mould illustrated in FIGS. 2 and 3 shown in a reversed position.

FIG. 4 shows the mould of FIG. 2 applied to the machine in the reverse position shown in FIG. 4, whilst FIG. 3 shows the two halves 23, 23′, intended to co-operate alternatively with 25, having a reciprocating movement in the direction of the arrows 24, 24′.

Figure 5:
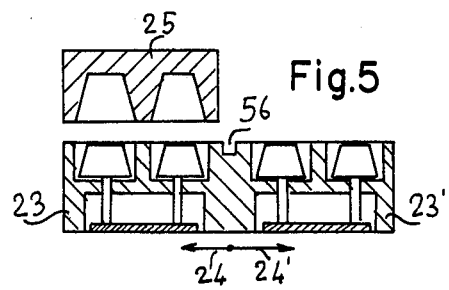

FIG. 5 shows the mould of FIG. 3 applied to the machine in the reverse position. It is obvious that the parts of the mould 25 are intended to always operate co-axially with 12.

The moulds of FIGS. 2 and 4 are adapted to negative heat moulding, whilst those in FIGS. 3 and 5 are for positive heat moulding and it is clear that the moulds of FIG. 2-FIG. 5 may be applied to vertical heat moulding machines, by rotating them vertically in the moulding station. The strip 10 is thereafter fed in the direction of the arrow 26 and the heat moulding of the objects and the cutting thereof takes place in station 12 during the intermittent movement of the feeding of the strip.

Figure 6:
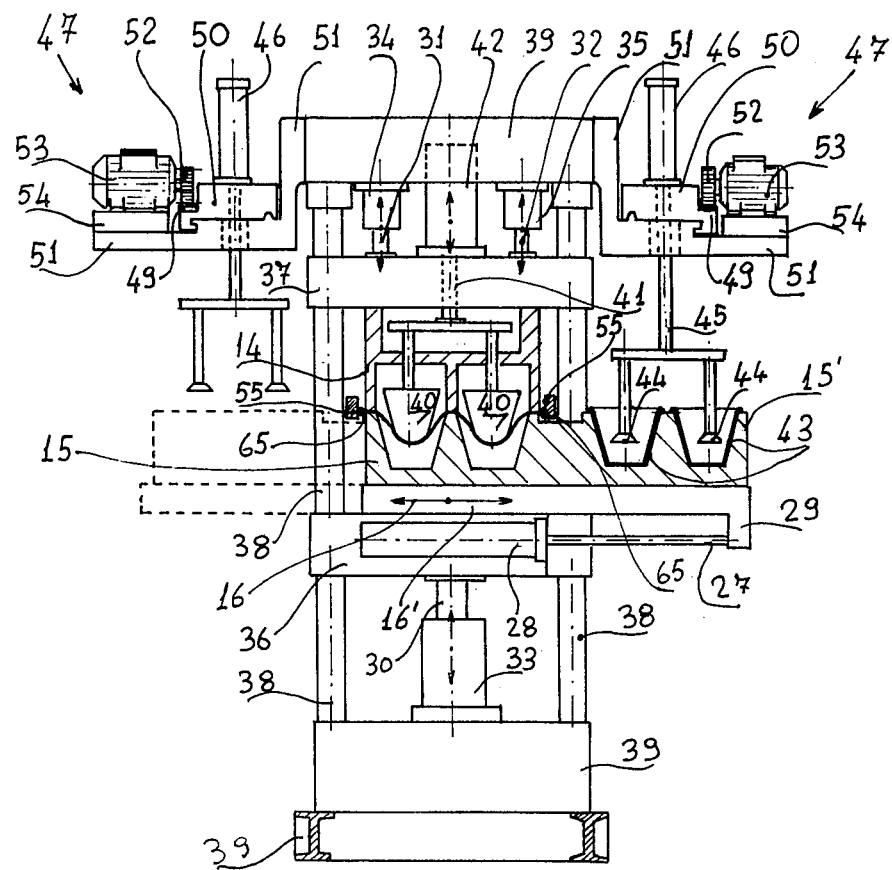
FIG. 6 is a schematic sectional view taken on the line 6—6 of the FIG. 1.

With reference to FIG. 6, it will be noted, that the heat moulding of the objects and the cutting thereof in the half 15′ has already taken place. Both parts of the mould, formed by 15′, 14 had opened by an amount necessary to permit the feeding of the strip 10 by one stage. After the opening of the mould is completed, the displacement of 15′ had been effected in the direction of the arrow 16′ to bring the half 15 coaxial with 14, by action of the rod 27 of the piston contained in the cylinder 28 on the slide 29 carrying the part 15, 15′ of the mould. The mould, formed by 15, 14 have then closed by action of the piston rods 30, 31, 32 contained in the cylinders 33, 34, 35 acting on the plates 36, 37, respectively carrying the guides for the slide 29 and the part 14 of the mould for sliding along the columns 28. The heat moulding cycle of the objects 43 is thus concluded in FIG. 6 in which the inoperative time was formed by the sum of the times:

(a) of cutting, (b) for the opening associated with the space necessary between the parts 14, 15′ of the mould to permit the advance of the strip 10 within the heat moulding station, the beginning of the advance effected immediately after the beginning of the opening of the mould;

(c) the period in which the mould is opened for the feeding of the strip 10 by one stage;

(d) for the closing of the two parts 14, 15 of the mould to permit the beginning of the following cycle, the beginning of the closure effected during the feeding of the strip 10, the conclusion of the closing of the mould and the end of the feeding of the strip being theoretically coincidental.

It should be noted that the periods in (b) and (d) are almost entirely superimposed on the period in (c), whilst the period in (a) is superimposed on the stabilisation period, which is protracted for the permanence of the objects cut within the dies of the parts 15′ of the mould, for the remainder of the inoperative period of the cycle and for a good part of the following period of the cycle.

It therefore follows that the inoperative periods of the heat moulding cycle, according to the invention, is slightly greater than the sum of the cutting and feeding periods of the strip 10 by one stage, the conditioning thereof being avoided relative to the depth of the heat moulded structure, to the stabilisation of the structure, to the extraction of the structure from the dies of the mould compared with the first process, whereby it is evident that, compared with the second process the conditioning thereof is avoided relative to the opening between the two parts of the mould greater than the depth of the heat moulded structure, the period in which the mould is open for the discharge of finished objects, relatively to the closing of the mould and relatively to the stabilisation of the heat moulded plastics material.

With reference again to FIG. 6, the beginning of the funnelling has already begun by means of the tensioning members 40 actuated by the piston rod 41 contained in the cylinder 42, whilst the finished objects 43 are ready to be extracted from the half 15′ by means of fans 44 connected to the piston rod 45 in the cylinder 46 which, in addition to raising the finished object 43 from the half 15′ discharges them to one of the four stations 19, 19′, 20, 20′, not shown in FIG. 6. When the heat moulding is completed and the cutting effected, the mould, formed of the parts 14, 15, opens by the amount necessary to permit the feed of the belt 10 within the station 12 whilst, as will be seen from FIG. 7, the displacement of 15 is effected in the direction of the arrow 18. Just before the end of the movement of 15, the parts 15′, 14, of the mould are ready to place themselves coaxially with each other in order to effect the closure to permit the beginning of a new heat moulding cycle.

The extracting device 47 on the left of the one shown in FIG. 6, when a good part of the moulding cycle is completed in the mould, formed of the parts 14, 15′, attend to the extraction of the object from the recesses in which they were located in 15.

Figure 8:
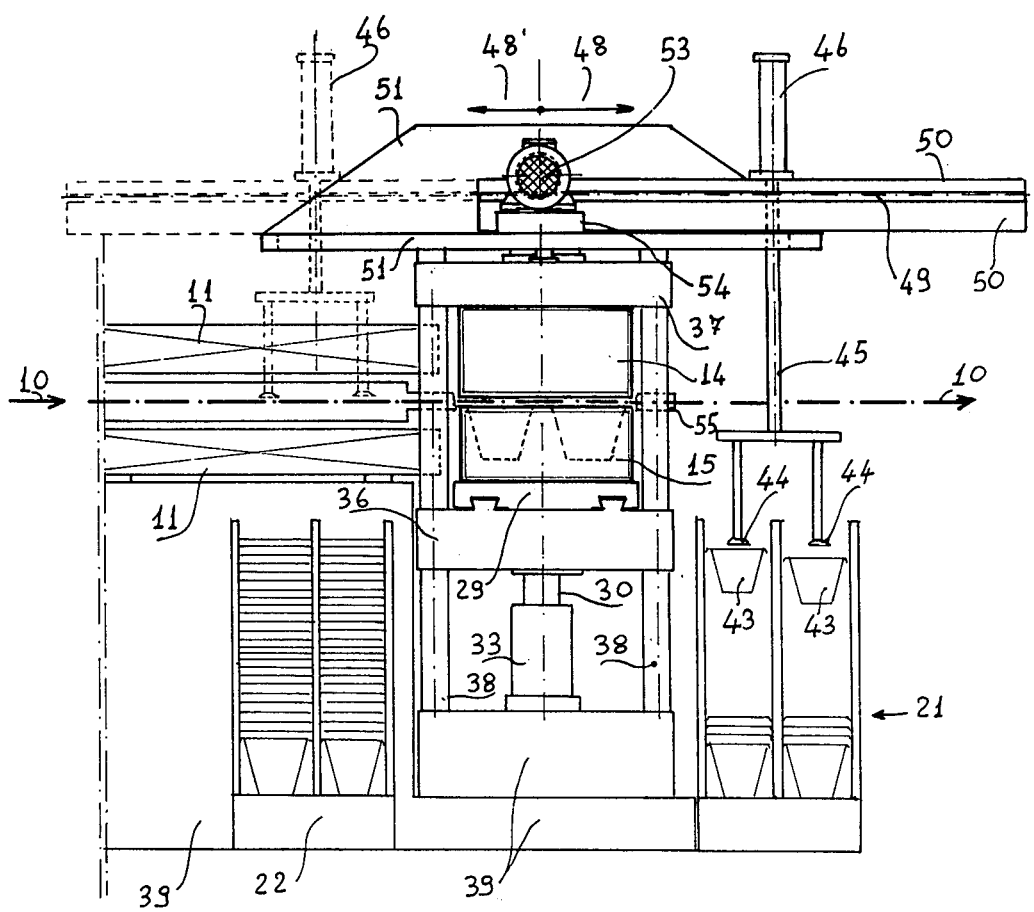
FIG. 8 is a partial schematic side view taken on the line 8—8 of FIG. 1.

With reference to FIG. 8, the aforesaid extractor device 47, after the objects 43 are extracted above 15, transports them from the position shown in FIG. 6, which is central relatively to the station 12, in the direction of the arrow 48, to the stacking station 21 on which it is lowered to allow them to fall. The displacement of device 47 in the direction of the arrow 48 is operated by a rack device 49 connected to a slide 50 displaceable along a yoke 51, connected to the frame 39 by the action of a toothed wheel 52 rotated by an electric motor 53 having a base 54 secured to the yoke 51. The displacement of device 47 in the direction indicated by 48 is effected because the stacking station 22 had been previously filled by displacement of device 47 and rack 49, shown in broken lines in FIG. 8 in the direction of the arrow 48′ by the wheel 52.

In FIG. 8, a part of the hauling device 55 of the strip 10 has been removed, indicated in broken lines, relative to the portion of the station 12 concerned, to permit a clear view of the very limited opening between the two parts of the mould during the beginning of the feeding phase of the strip 10. This opening will have to further increase, at least for downward displacement of the parts 15, 15' of the mould, to allow this part to arrive at a lower level than the lower part of the haulage device, to permit the displacements of 15, 15' at right angles to the direction of feed of the strip.

The maximum opening of the mould is in fact slightly more than the depth of the recesses 56 provided on the moulds shown in FIGS. 2-5. It is also obvious that the maximum opening of the mould is very much less than the depth of the heat moulded structure, necessary according to the first and second part of the description.

From FIG. 7 it is apparent that there is almost total superposition between the opening and closing operation of the mould compared with the advance of the strip by one stage.

In addition to this, from what has been described with reference to FIGS. 6 and 8, it is clear that the extraction times of the finished products 43 and the stacking thereof have no influence on the operative time of the cycle.

The stacking stations 19' and 21' shown in FIG. 1 may be used for receiving rejected finished objects which have been discharged from, for example, heat moulded structures from a section of strip having imperfections.

Numerous advantages are afforded by the visible monitoring of the finished objects before they are extracted. This monitoring, concerning malformed objects due to imperfections of the strip, may also be automatically effected by a suitable means installed on the machine for controlling the extracting and stacking means in various ways, easily perceived from that for the well formed finished objects.

Assuming that a heat moulding cycle, due to imperfections in the strip, has produced malformed objects, some of which it has not been possible to extract from the dies with a single extractor device 47, the visible control makes it possible to lock a machine to manually extract the objects which have remained stacked in the dies, thereby avoiding possible damage to the moulds and the cutting devices (not shown) included therein, being of known type. This happens very frequently with the initial and terminal moulded articles of a spool as described above concerning imperfections of the strip. Another advantage due to the visible monitoring of the finished objects before they are extracted from the dies makes it possible to distinguish malformed objects by means of the heating of specified zones of the strip with consequent rapid identification of the zones in which the heating has to be increased.

Another advantage of the visible monitoring makes it possible to identify which parts of the components necessary for the heat moulding and cutting are deteriorating for example and operate precariously, and thus it is possible to attend rapidly to necessary repairs or replacements.

The stacking stations 20' and 22' of FIG. 1, can receive finished objects, suitably by varying the displacements of the extractor and stacking devices illustrated, with means not shown in the drawings, but within the scope of a person skilled in the art.

With reference to FIGS. 9 and 10 it will be noted that the two moulds, almost double relatively to those normally used, are each formed of two halves, the first by 59, 59' and 60, 60', the second by 61, 61' and 62, 62'. It is clear that, with such moulds, a moulding cycle is effected with halves 59, 60 after which the half 60 will be displaced in the direction of the arrow 63', whilst the half 59 will be displaced in the direction of the arrow 63 to permit the halves 59' and 60' to effect the next cycle, after which the half 69' will return to the position shown in the Figure with displacement in the direction of the arrow 63', whilst the half 60' will be displaced in the direction of the arrow 63 to resume the position shown in the Figure.

The mould shown in FIG. 9 is for negative heat moulding, whilst the mould shown in FIG. 10 is for positive heat moulding, and it may be seen that the parts thereof are displaced, as a result of the cycles, in the directions of the arrows 64, 64', in the same manner as described for the parts of the mould shown in FIG. 9.

The maximum opening of the moulds shown in FIGS. 2 to 5 may be conditioned merely by the thickness of one of the components clamping the strip to the hauling device 55, which components may be formed by pairs of jaws indicated by 65 in FIG. 6. This embodiment is within the scope of a person skilled in the art, since it is only necessary to locate the jaws in the lower part of the hauling device 55 instead of in the middle as shown in FIG. 6.

The maximum opening of the moulds shown in FIGS. 9 and 10 is in every case conditioned by the height of the hauling device 55, being enclosed between 57 and 58.

Although it is not shown in the drawings, it must be remembered that the system of the present invention may be applied to heat moulding machines on which the strip is provided with a continuous feed drive, it being sufficient, for this purpose, to provide a feed drive corresponding to that of the strip, for the parts forming the moulding and cutting station and associated extracting and stacking devices and corresponding stacking stations, at the moment the mould is closed, and with a reverse drive at the moment the mould is opened to bring it to the beginning position of the cycle. With such an embodiment it is clear that the inoperative time of the cycle is subsequently reduced, even compared with the previously described example illustrated in the accompanying drawings, since the time in which the strip is fed by one stage is practically halved.

It is also clear that any formal variations made to the object of the present invention in a practical embodiment must be considered as coming within the scope of the present invention, because they do not change the substance thereof, such as for example the replacement of the rack device by a pneumatic, or hydraulic device or the like.

I claim:

1. A process for the production of hollow finished objects from a strip of plastic material by heat moulding at a moulding station, said process comprising the steps of:

heating the strip;
   feeding the heated strip to the moulding station;
   heat moulding at least one object;
   cutting the moulded object from the strip at said station;

opening the mould only a distance sufficient to allow further feeding of the strip upon completion of said heat moulding and cutting steps;

further feeding the strip such that the portion of the strip from which the object was removed is out of the moulding station and a further heated portion of the strip is in the moulding station, said further feeding step commencing as soon as the mould is open;

moving a portion of the mould containing the moulded object out of the moulding station and moving a similar portion of the mould into the moulding station simultaneously with said further feeding step;

repeating said heat moulding and cutting steps to form at least one further object upon completion of said further feeding step;

removing the first-mentioned object from the portion of the mould after the expiration of a predetermined stabilization period, said stabilization period beginning with the completion of said heat moulding step and ending during said repeating step.

2. The process as claimed in claim 1, wherein said heat moulding step includes the step of closing a two part mould around the heated strip, and said cutting step is performed within the closed mould.

3. The process as claimed in claim 1, wherein said stabilization period of the object includes the time during which said opening step, said further feeding step, said moving step, and at least a portion of the heat moulding step of a further object occur.

4. The process as claimed in claim 1, wherein said moving step includes moving the portions of the mould at right angles to the feed direction of the strip.

5. The process as claimed in claim 1, wherein said moving step includes moving the portions of the mould obliquely to the feed direction of the strip.

6. A process for the production of hollow finished objects from a strip of plastic material by heat moulding at a single moulding station, the mould having two parts, at least one of which is movable to form a passage between the two parts of a minimum height to allow passage of a strip therethrough, at least the part of the mould for retaining the objects having two halves and being movable such that one or the other half is in the moulding station and mates with the other part of the mould, said process comprising the steps of:

heating the strip;

feeding the heated strip to the moulding station;

closing the mould around the strip;

heat moulding at least one object;

cutting said object from the strip within the closed mould, said heat moulding and said cutting steps defining the operative period of the output cycle;

separating the two parts of the mould;

further feeding the strip such that a further heated portion is in the moulding station and the portion of the strip from which the object was removed is out of the moulding station;

reclosing the mould;

moving the half of the part of the mould retaining the object out of the moulding station and moving the other half into the moulding station during said separating, said further feeding and said reclosing steps, the last three mentioned steps defining the inoperative period of the output cycle;

further heat moulding and cutting at least a further object while the first moulded object is stabilizing;

retaining the first moulded object in the mould for a stabilization period longer than the sum of the operative and inoperative periods of a single output cycle, said stabilization period including a portion of the operative period during which the object is formed, the following inoperative period, and a portion of said further heat moulding and cutting step;

removing the first formed object from the mould at the end of the stabilization period; and repeating said separating, further feeding, reclosing, moving, further heat moulding, retaining and removing steps to form further objects.

7. The process as claimed in claim 6, wherein both parts of the mould have two halves and are movable such that one or the other half is in the moulding station, said moving step further including the step of moving the part of the mould which mates with the part retaining the object in a direction opposite to the direction in which the part retaining the object is moved, such that a left half of one part of the mould mates with a right half of the other part of the mould, and vice versa.

8. The process as claimed in claim 6, wherein said moving step includes moving the part of the mould at right angles to the feed direction of the strip.

9. The process as claimed in claim 6, wherein said moving step includes moving the part of the mould obliquely to the feed direction of the strip.

* * * * *

UNITED STATES PATENT OFFICE
CERTIFICATE OF CORRECTION

Patent No. 4,105,736  Dated August 8, 1978

Inventor(s) Pietro Padovani

It is certified that error appears in the above-identified patent and that said Letters Patent are hereby corrected as shown below:

On the cover sheet, Foreign Application Priority Data should read:

-- Italy          84945-A          October 9, 1975 ---.

Signed and Sealed this

Sixth Day of February 1979

[SEAL]

Attest:

RUTH C. MASON
*Attesting Officer*

DONALD W. BANNER
*Commissioner of Patents and Trademarks*